J. B. MERRITT.
WHEEL FEED.
No. 105,476.
Patented July 19, 1870.
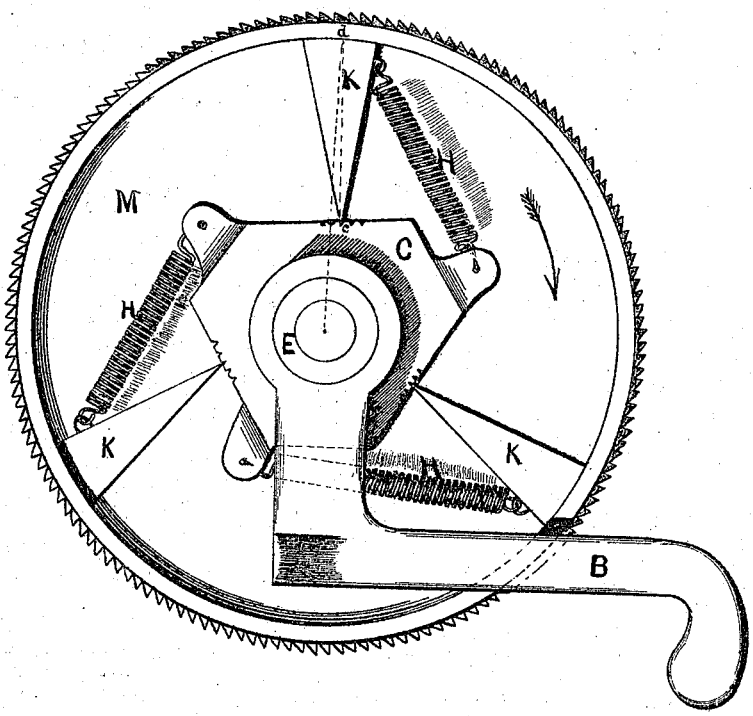

United States Patent Office.

JOSEPH B. MERRITT, OF ABINGTON, MASSACHUSETTS.

Letters Patent No. 105,476, dated July 19, 1870.

IMPROVEMENT IN WHEEL-FEEDS.

The Schedule referred to in these Letters Patent and making part of the same.

To all whom it may concern:

I, JOSEPH B. MERRITT, of Abington, in the county of Plymouth and State of Massachusetts, have invented certain new and useful Improvements in Wheel-Feeds, of which the following is a specification.

The Nature of the Invention.

The nature of my invention consists in combining with a loose center a series of toggles, so arranged, in combination with the periphery of a wheel, that, if the loose center is revolved in one direction, the outer ends of the toggles have a tendency to fall back from the radial line, and thus allow the loose center to revolve about the wheel; but if the loose center is revolved in the other direction, the inner end of the toggle has a tendency to move toward the radial line, and thus to exert a toggle pressure upon the periphery of the wheel, and thus to force it to move around with the center piece.

The drawing represents a plan of my invention.

General Description.

M represents the wheel, which is to be moved forward at intervals by the reciprocating motion of the lever B, attached to the center-piece C.

E is a hollow boss attached to the wheel M, and forms a journal, about which the loose center-piece C turns.

K is a toggle, the inner end of which forms a knife-edge joint with the center-piece C, and the outer end of which bears upon the inner periphery of the wheel M.

H is a spring attached to the toggle K and center-piece C, as shown, and serves to keep the toggle in position.

The point $c$ of the toggle K is placed slightly to one side of a radial line passing to the point $d$, which is the center of contact of the toggle with the periphery, so, if C is revolved in the direction opposite that indicated by the arrow, the tendency is to bring the point $c$ toward the radial line, and thus force the end of the toggle K to bear hard against the periphery, and thus cause it to revolve with the center-piece C; but if the center-piece C is revolved in the direction indicated by the arrow, the toggle K falls back, and allows the center-piece to move independently of the wheel M.

I claim as my invention—

The combination of the adjustable toggles K K K, the springs H H H, and the center-piece C, arranged and operating as described and for the purpose set forth.

JOSEPH B. MERRITT.

Witnesses:
FRANK G. PARKER,
JAS. S. CONANT.